US005280632A

United States Patent [19]

Jung-Gon

[11] Patent Number: 5,280,632

[45] Date of Patent: Jan. 18, 1994

[54] METHOD OF TRANSMITTING AND RECEIVING WARNING BROADCAST SIGNALS DURING DRIVE IN DANGEROUS AREA, AND SYSTEM THEREOF

[75] Inventor: An Jung-Gon, Sung Nam, Rep. of Korea

[73] Assignee: Hyundai Electronics Industries Co., Ltd., Kyung Ki, Rep. of Korea

[21] Appl. No.: 796,087

[22] Filed: Nov. 20, 1991

[30] Foreign Application Priority Data

Nov. 26, 1990 [KR] Rep. of Korea .................... 90-19228

[51] Int. Cl.[5] .......................... H04B 7/00; G08G 1/09

[52] U.S. Cl. ........................................ 455/70; 340/905

[58] Field of Search .................... 455/70, 68, 45, 54.1, 455/54.2, 56.1, 129, 186.1, 186.2, 194.1; 340/905, 825.63, 825.64; 375/22, 23

[56] References Cited

U.S. PATENT DOCUMENTS 3,710,313 1/1973 Kimball et al. .
3,760,349 9/1973 Keister et al. .
3,899,671 8/1975 Stover ............................... 455/56.1
4,100,529 7/1978 Evans .................................. 455/70
4,186,345 1/1980 Marita et al. .................. 340/825.64
4,241,326 12/1980 Odom .
4,275,394 6/1981 Mabuchi et al. ............... 340/825.63
4,907,159 3/1990 Mauge et al. ...................... 340/993

FOREIGN PATENT DOCUMENTS 0349470 3/1990 European Pat. Off. ........... 340/905

*Primary Examiner*—Reinhard J. Eisenzopf
*Assistant Examiner*—Nguyen Vo
*Attorney, Agent, or Firm*—McGlew and Tuttle

[57] ABSTRACT

The present invention discloses a system capable of outputting a warning broadcast after picking up warning signals from a non-human-attended transmitter installed in a dangerous area, when an automobile runs such a dangerous area. Conventionally there are only warning signs installed on roads. If a driver enters into a dangerous area for the first time, or at night, the driver can often fail to properly cope with the suddenly appearing danger. The present invention gives a solution to such a problem in such a manner that a non-human-attended transmitter is installed in each of dangerous areas in order to emit relevant warning signals based on the particular feature of the danger lying ahead on the road (such as sharp curve of the road, steep slope of the road and the like), and that each automobile is provided with a receiver for picking up the warning signals emitted by the transmitter in order to output a warning broadcast by drawing the broadcasting data from a data memory of the receiver based on the received warning signals. Thus a driver is warned of the danger lying ahead in the form of a broadcast, so that the driver should be able to be ready for the imminent danger lying ahead.

2 Claims, 3 Drawing Sheets

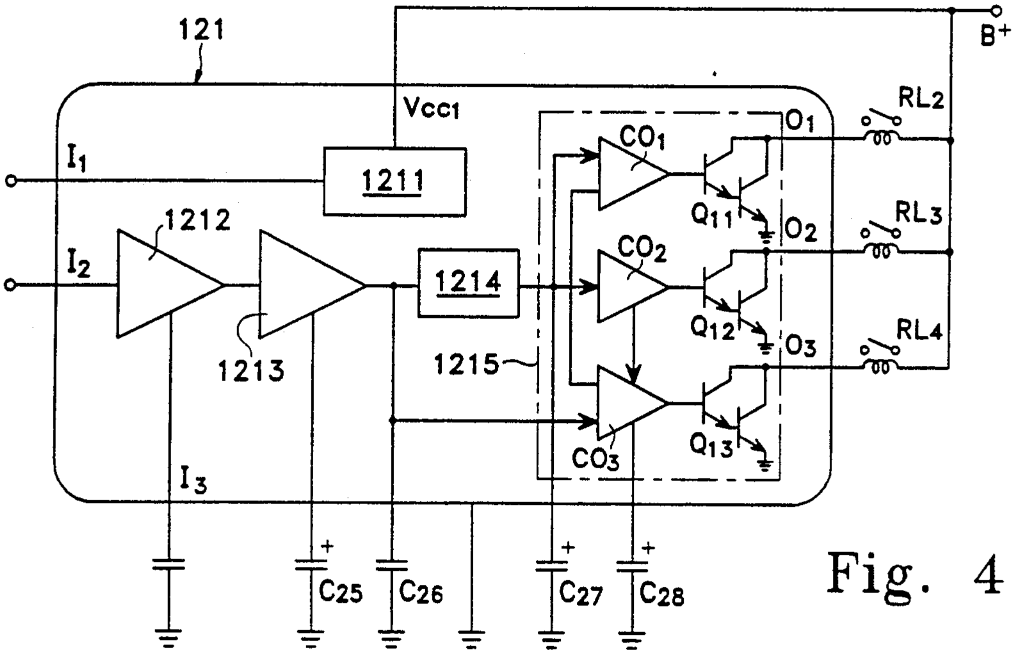
Fig. 4
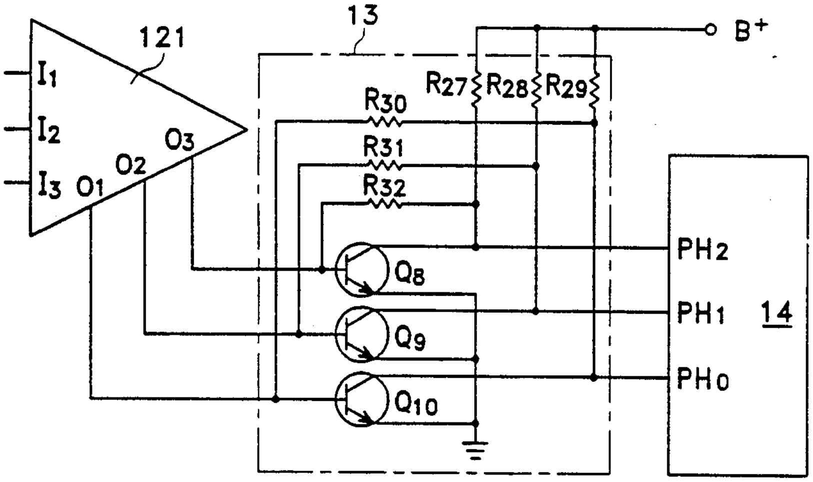
Fig. 5
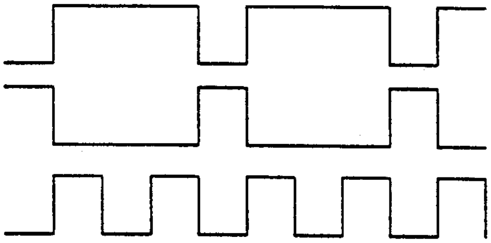
Fig. 6A
Fig. 6B
Fig. 6C

METHOD OF TRANSMITTING AND RECEIVING WARNING BROADCAST SIGNALS DURING DRIVE IN DANGEROUS AREA, AND SYSTEM THEREOF

FIELD OF THE INVENTION

The present invention relates to a system and a method of transmitting and receiving warning broadcast signals for informing the driver of the particular situation (such as sharp curve of the road, steep slope of the road and the like), when an automobile is running a dangerous area. Particularly, the present invention relates to a system and a method of transmitting and receiving warning broadcast signals during the driving in a dangerous area, in which a transmitter for outputting different warning signals is installed in each of dangerous areas, and a receiver for receiving the warning signals is installed in an automobile in such a manner that, during a driving in a dangerous area, the warning signals from the transmitter of the area should cause an audio apparatus of the automobile to generate a warning broadcast by drawing the broadcasting data from a memory part of the receiver, thereby making the driver alert against the imminent danger.

BACKGROUND OF THE INVENTION

Conventionally, there has been none of such a transmitting and receiving system installed in a dangerous area or in an automobile, but only warning signs for informing of the road situations are installed on the road. Therefore, when a driver runs a road for the first time or during a night, if he or she is encountered with a sharp curve or a steep slope suddenly, it is difficult for him or her to become ready to the situation, thereby being led to an accident often. Particularly, even if the driver is accustomed to the road, if the situation of the road is changed by road constructions and the like, the driver can fail to adapt to the new situation (that is, the driver can not exert a defensive vigil, but can drive in a careless manner), with the result that a large scale accident can occur sometimes.

SUMMARY OF THE INVENTION

The present invention is intended to overcome the above described disadvantages of the conventional technique.

Therefore it is the object of the present invention to provide a system and a method of transmitting and receiving warning broadcast signals during the driving in a dangerous area, in which warning signal transmitters are installed in dangerous areas (such as sharp curve of the road, steep slope of the road and the like), and an automobile is provided with a receiver, together with a memory storing a number of broadcasting data sets, so that, when an automobile runs a dangerous area, the receiver (installed on the automobile) should pick up the warning signals from the warning signal transmitter of the area in order to cause an audio apparatus of the automobile to output a relevant broadcast, thereby bringing the attention of the driver to the situation of the road in advance, making it possible for the driver to become defensive against the imminent danger, and preventing the possible accident which is liable to occur in a suddenly encountered situation.

BRIEF DESCRIPTION OF THE DRAWINGS

The above object and other advantages of the present invention will become more apparent by describing in detail the preferred embodiment of the present invention with reference to the attached drawings in which:

FIG. 4 illustrates in detail the integrated circuit installed within the receiver of FIG. 3;

FIG. 5 illustrates another embodiment of the switching means of FIG. 3; and

FIGS. 6A to 6C illustrate wave patterns for the apparatus of the present invention.

DESCRIPTION OF THE PREFERRED EMBODIMENT

Figure 1:
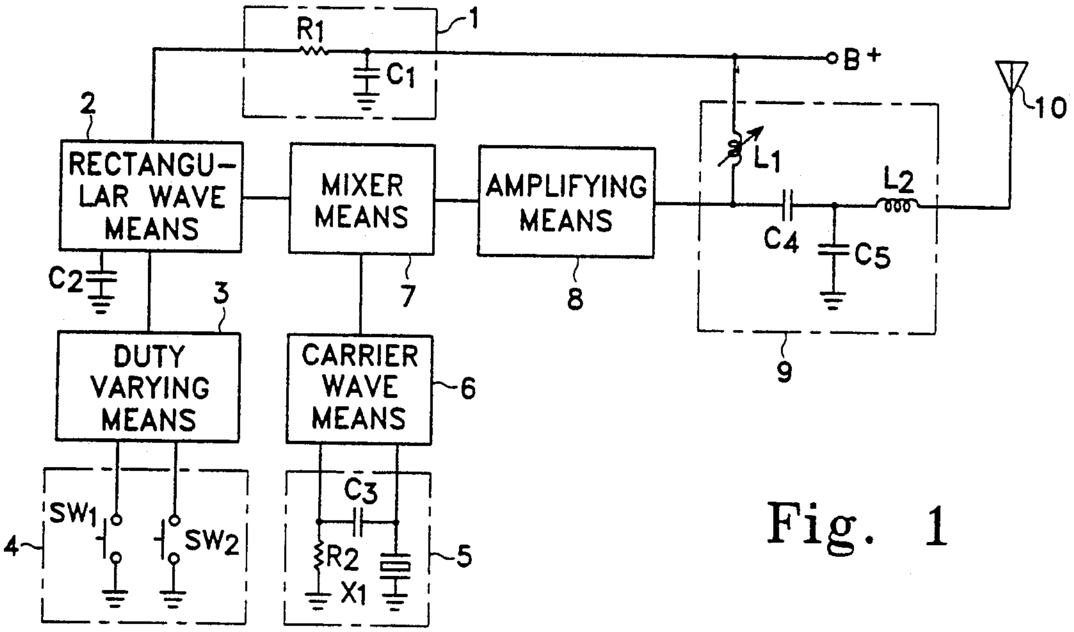
FIG. 1 illustrates the circuit of the transmitter according to the present invention.

FIG. 1 illustrates the transmitter of the present invention for outputting different warning signals depending on the particular feature of a dangerous area. As shown in this drawing, the circuit of the transmitter includes: an integrator 1 consisting of a condenser C1 and a resistor R1 having proper time constants, and for performing integrations upon supplying a power source B+; a rectangular wave generating means 2 for outputting rectangular wave signals fitting to the situation of the dangerous area after receipt of the output signals of the integrator 1 and the output signals of a duty varying means 3; the duty varying means 3 being for outputting proper signals in order to inform of the situation of the dangerous area (where the transmitter is installed) by setting the period T of the pulse from the rectangular wave generating means 2 in accordance with the output of a switching means 4 (consisting of two switches SW1, SW2); a frequency generating means 5 for generating proper frequencies, and consisting of a resistor R2, a condenser C3 and a quartz oscillator X1; a carrier wave generating means 6 for converting the output of the frequency generating means 5 to a proper carrier frequency after receipt of them; a mixer means 7 for loading the rectangular waves of the rectangular wave generating means 2 to the carrier waves of the carrier wave generating means 6; a high frequency power amplifying means 8 for amplifying the high frequency output signals of the mixer means 7 to a transmittable level (transmittable into the air); and a transmitting means 9 including a variable coil L1, condensers C4,C5 and a coil L2 (having a time constant) in an interconnected form, and for transmitting the warning rectangular and carrier signals from the high frequency power amplifying means 8 through an antenna 10 into the air.

Figure 2:
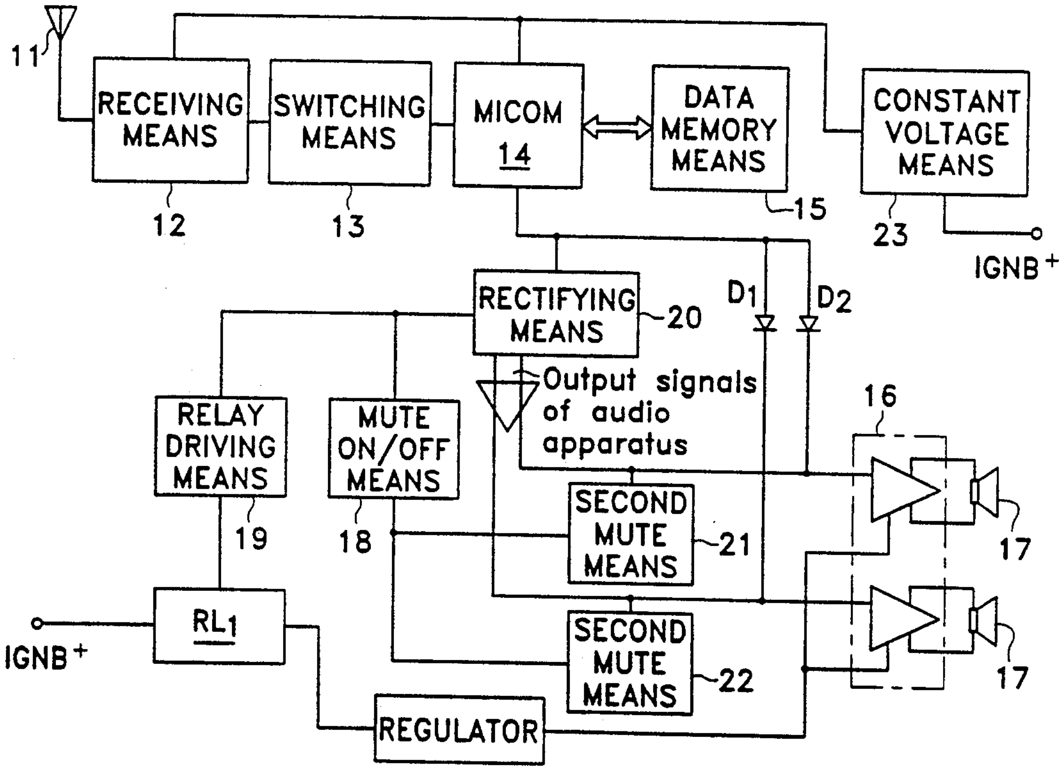
FIG. 2 is a block diagram showing schematically the constitution of the receiver according to the present invention.
Figure 3:
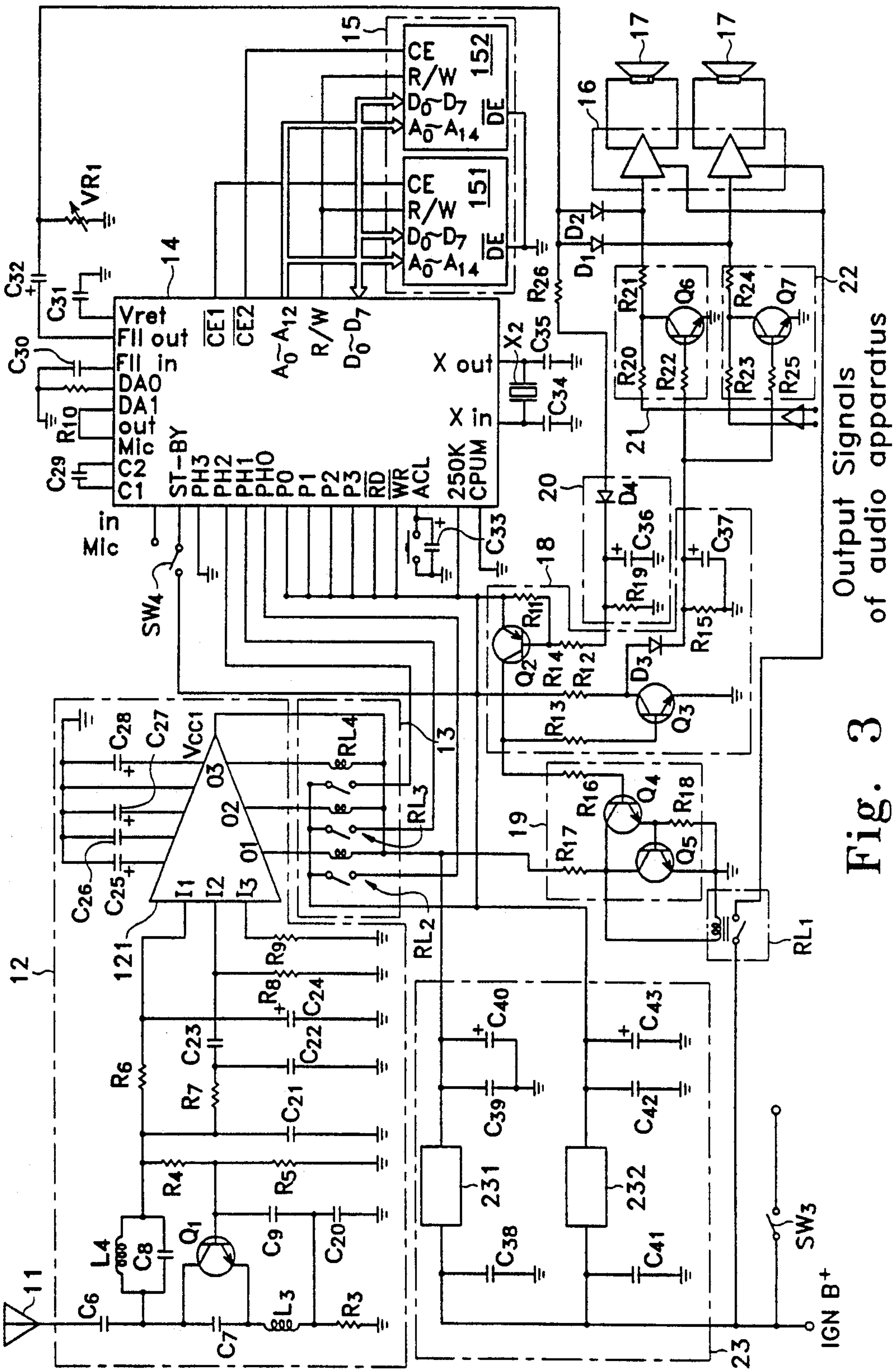
FIG. 3 illustrates in detail the circuit of the receiver according to the present invention.

Meanwhile, FIGS. 2 and 3 illustrate the receiver of the present invention for picking up the warning signals from the transmitter, and for performing a warning broadcast upon entering into a dangerous area.

As shown in these drawings, the receiver of the present invention includes:

- a receiving means 12 consisting of condensers C6–C28, resistors R3–R9, coils L3–L4, a transistor Q1 and an interated circuit 121, and for removing carrier signals after receipt of the warning signals from the transmitter through the antenna 11, and for controlling a switching means 13 (to be described below) in accordance with the output signals of the rectangular wave generating means 2;

a switching means 13 consisting of three relays RL2–RL4, transistors Q8–Q10 and resistors R27–R32 (as shown in FIG. 6), and for being selectively turned on and off in accordance with the output status of the receiving means 12 in order to control the signals supplied to phase signal input terminals PH0–PH2 of a micom 14 to be described below;

the micom 14 being for converting the warning signals (received through the antenna) to digital signals in order to store them in a data memory means 15, and for selectively outputting the relevant broadcasting data from the data memory means 15 (consisting of two S-RAMs 151,152) in accordance with the output conditions of the switching means 13;

a low frequency power amplifying means 16 consisting of two amplifiers, and for amplifying the warning broadcasting signals of the micom 14 to a sufficient level so as for the above signals to be supplied through diodes D1,D2 to a speaker 17;

a rectifying means 20 consisting of a diode D4, a condenser C36 and a resistor R19, and for rectifying the output signals of the micom 14, and for supplying the power source to a relay driving means 19 and a mute on/off switching means 18 (to be described below);

the mute on/off switching means 18 consisting of resistors R11–R15, a diode D3, a condenser C37 and transistors Q2,Q3, and for muting the audio signals by supplying high signals to first and second muting means 21,22 upon outputting a proper voltage from a rectifying means 20 in accordance with the output signals of the micom 14, and for preventing the muting of the audio signals by supplying a low signal if otherwise;

a relay driving means 19 consisting of resistors R16–R18 and transistors Q4,Q5, and for driving the relay RL1 in order to control the power source IGN B+ upon outputting of a proper voltage from the rectifying means 20 in accordance with the output of the micom 14, and for causing a warning broadcast to be outputted by driving the low frequency power amplifying means 16 even under the non-driving of the audio apparatus of the automobile;

first and second muting means 21,22 consisting of resistors R20–R22,R23–R25 and transistors Q6–Q7, and for muting the audio signals supplied to the audio apparatus upon outputting of a high signal from the mute on/off switching means 18; and a constant voltage means 23 consisting of regulators 231,232 (for outputting different voltages) and a plurality of condensers C38–C43, and for stepping up or down the power source voltage IGN B+ to proper levels to supply them to the respective means.

Meanwhile, as shown in FIG. 4, the integrated circuit 121 which is installed within the receiving means 12 includes: a constant voltage means 1211 for outputting a proper voltage; amplifiers 1212,1213 for amplifying the inputted signals in two steps; an integrator 1214 for integrating the signals outputted from the amplifier 1213; and an output means 1215 consisting of comparators C01–C03 and darlington connecting type transistors Q11–Q13, and for controlling the driving of the switching means 13 in accordance with the rectangular warning signals received.

In the drawing, reference code SW3 indicates a switch for controlling the power source supplied to an audio apparatus (not shown); SW4 indicates a switch for controlling the waiting power source supplied to the micom 14; C29–C35 indicate condensers; R10 and R26 indicate resistors; VR1 indicates a variable resistor for adjusting the levèl of the output signals of the micom 14; and X2 indicates a quartz oscillator for deciding the driving frequency of the micom 14.

The present invention constituted as above will now be described as to its operation and effects referring to FIGS. 6A–6C.

First, if the switches SW1,SW2 of the switching means 4 (which is connected to the duty varying means 3 of the receiver) are properly manipulated, then the period T of the rectangular waves corresponding to the dangerous area is decided. If only the switch SW1 is turned on, the output signals of the rectangular wave generating means 2 will have a wave pattern as shown in FIG. 6A, while, if only the switch SW2 is turned on, a wave pattern separated by 180 degrees from that of FIG. 6A will be generated as shown in FIG. 6B. Meanwhile, if both of the switches SW1,SW2 are turned on, a rectangular wave having the pattern of FIG. 6C is generated, and thus, different kinds of signals are generated depending on the feature of the dangerous area (such as sharp curve of the road, steep slope of the road and the like).

Further, the rectangular waves which are outputted in the above described manner are loaded through the mixer means 7 to carrier waves (usually 27 MHz) outputted from the carrier wave generating means 6. Then the rectangular waves are amplified by the high frequency power amplifying means 8, and then, are transmitted into the air through the antenna 10 which is connected to the output terminal of the transmitting means 9.

Therefore, if an automobile runs an area where such a transmitter is installed, warning signals which are transmitted from the transmitter are received through the antenna 11 of the receiver to the receiving means 12.

Then the receiving means 12 removes the carrier waves, and detects the rectangular waves corresponding to the dangerous area. If the automobile is running a dangerous area where the rectangular waves of FIG. 6A are being outputted, the darlington connecting type transistor Q11 of the integrated circuit 121 is turned on so as for the relay RL2 to be turned on, with the result that a high signal is inputted into the phase signal input terminal PHO of the micom 14. If an automobile is running a dangerous area where the rectangular waves of FIG. 6B or 6C are being outputted, the darlington connecting type transistors Q12,Q13 and the relays RL3,RL4 which are controlled by the former are all turned on, with the result that high signals are supplied to the phase signal input terminals PH1,PH2 of the micom 14 respectively.

Accordingly, the micom 14 recognizes the signals which are inputted through the phase signal input terminals PH0–PH2, and then, outputs a warning broadcast informing of the imminent danger lying ahead.

That is, in accordance with the warning signals inputted through the phase signal input terminals PH0–PH2, the micom 14 selectively draws out the broadcasting data stored in the data memory means 15, converts them into analogue signals, and supplies them through the output terminal (Fil Out) and through the diodes D1,D2 to the low frequency power amplifying means 16. Under this condition, a part of the warning broadcast signals which are outputted from the micom 14 are rectified by the rectifying means 20, and then, are supplied to the base of the transistor Q2 of the mute on/off switching means 18, with the result that the transistors Q2,Q3 are sequentially turned off.

Therefore, the output voltage of the regulator 232, which is supplied to the collector of the transistor Q3, is supplied to the bases of the transistors Q6,Q7 of the first and second muting means 21,22, with the result that the transistors Q6,Q7 are turned on. Consequently, the audio signals which are outputted from the audio apparatus (not shown) are muted by the transistors Q6,Q7, while only the warning broadcast signals which are outputted from the micom 14 are amplified by the low frequency power amplifying means 16, and are outputted through the speaker 17. Therefore, even if a driver is first in a road, the driver can easily recognize the danger lying ahead, and therefore, a terrible accident can be prevented.

Meanwhile, if the warning broadcast data are outputted, the transistor Q2 is turned off to be kept in the turned-off state, and therefore, the transistor Q4 of the relay driving means 19 is turned off, as well as the transistor Q5 being turned off.

Accordingly, the output voltage of the regulator 221, which is supplied through the resistor R17, is supplied to the relay RL1 so as for the relay RL1 to be turned on, with the result that the power source voltage IGN B+ is supplied to the low frequency power amplifying means 16 which is installed within the conventional audio apparatus. Therefore, even if the audio apparatus is in a non-driven state, if the micom 14 outputs warning broadcast signals, then the driving voltage is supplied to the low frequency power amplifying means 16, so that the driver should be ready against the danger lying ahead.

FIG. 5 illustrates another embodiment of the switching means 13. In this embodiment also, when low signals are outputted from the output terminals 01–03 of the integrated circuit 121, the transistors Q8–Q10 are selectively turned off. Thus, when a high signal is supplied to the phase signal input terminals PH0–PH2 of the micom 14, there is outputted a broadcast informing of the particular situation of the dangerous area.

According to the present invention as described above, a transmitter for outputting warning signals is installed at each of dangerous areas, and a receiver for picking up the warning signals and for outputting the corresponding broadcast based on the warning signals from the transmitter is installed in each automobile, so that the driver should be ready for coping with the imminent danger lying ahead. Thus, even in nights, drivers can be protected from terrible accidents which are liable to occur in dangerous areas.

What is claimed is:

1. A system for transmitting and receiving warning broadcast signals during the driving in a dangerous area, said system comprising a transmitter for transmitting warning signals in said dangerous area, and a receiver installed in an automobile in order to pick up the warning signals and in order to output a broadcast corresponding to the dangerous area, said transmitter comprising an integrator for integrating the supplied power to transfer it to a rectangular wave generating means;

said rectangular wave generating means for generating rectangular signals corresponding to the particular feature of the dangerous area, after receipt of signals from said integrator and a duty varying means;

said duty varying means for deciding the period T of pulses of said rectangular wave generating means in accordance with the output conditions of a switching means;

a frequency generating means for generating an oscillating frequency;

a carrier wave generating means for generating a carrier frequency after receipt of the output signals of said frequency generating means;

a mixer means for combining said rectangular signals with said carrier frequency to form high frequency output signals;

a high frequency power amplifying means for amplifying the high frequency signals outputted from said mixer means; and a transmitting means for transmitting the output signals of said high frequency power amplifying means through an antenna into the air, and said receiver comprising a receiving means for removing the carrier waves from the warning signals after receipt of the transmitted signals from said transmitter through a receiver antenna;

a switching means for performing different switching operations based on the period T of the remaining rectangular waves after the removal of the carrier waves by said receiving means;

a micro computer for converting the output signals of said switching means (transmitted from said transmitter) to digital signals before storing them into a data memory means, and for selectively outputting the relevant warning broadcast from the data memory means;

said data memory means for storing various broadcasting data, and for operating under the control of said micro computer;

a low frequency power amplifying means for amplifying the warning broadcast outputted from the micro computer before outputting it through a speaker;

a rectifying means for rectifying the output signals of said micro computer in order to supply a power source to both a mute on/off switching means and a relay driving means;

said muting on/off switching means for deciding as to whether or not to mute the output signals of an audio apparatus of the automobile in accordance with the broadcasting data output status of said micro computer;

said relay driving means for driving a relay RL1, with said relay RL1 being for deciding as to whether or not to supply a power source IGN B+ to said low frequency power amplifying means in accordance with the broadcasting data output status of said micro computer;

first and second muting means 21,22 for muting the output signals of said audio apparatus upon outputting of said warning broadcast from said micro computer; and a constant voltage means for applying the IGN B+ to said receiver after converting it to a predetermined level.

2. A system for receiving warning broadcast signals during the driving in a dangerous area, which comprise a receiver installed in an automobile in order to pick up the warning signals and in order to output a broadcast corresponding to the dangerous area, said receiver comprising a receiving means for removing carrier waves from the warning signals after receipt of the transmitted signals from a transmitter through an antenna;

a switching means for performing different switching operations based on a period T of remaining rectangular waves after removal of the carrier waves by said receiving means;

a micro computer for converting the output signals of said switching means (transmitted from said transmitter) to digital signals before storing them into a data memory means, and for selectively outputting the relevant warning broadcast from the data memory means;

said data memory means for storing various broadcasting data, and for operating under the control of said micro computer;

a low frequency power amplifying means for amplifying the warning broadcast outputted from the micro computer before outputting it through a speaker;

a rectifying means for rectifying the output signals of said micro computer in order to supply a power source to both a mute on/off switching means and a relay driving means;

said mute on/off switching means for deciding as to whether or not to mute the output signals of an audio apparatus of the automobile in accordance with the broadcasting data output status of said micro computer;

said relay driving means for driving a relay RL1, with said relay RL1 for deciding as to whether or not to supply a power source IGN B+ to said low frequency power amplifying means in accordance with the broadcasting data output status of said micro computer;

first and second muting means 21,22 for muting the output signals of said audio apparatus upon outputting of said warning broadcast from said micro computer; and a constant voltage means for applying the IGN B+ to said receiver after converting it to a predetermined level.

* * * * *